Figure 1:
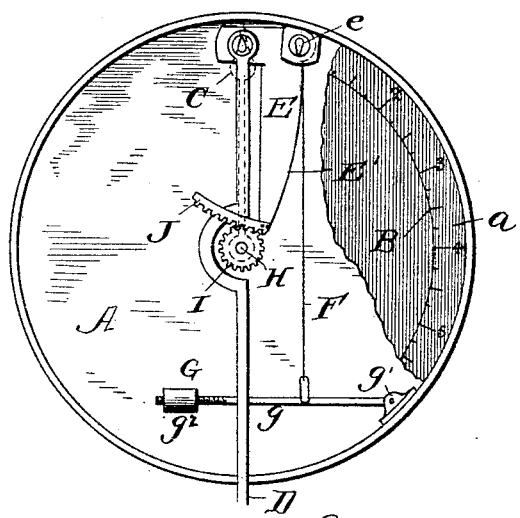

(No Model.)

L. C. FARMER.
PENDULUM WEIGHING SCALE.

No. 499,378.  Patented June 13, 1893.

Witnesses:
J. B. McGier
F. H. Benjamin

Inventor,
Luther C. Farmer
by J. O. Barker
Atty.

UNITED STATES PATENT OFFICE.

LUTHER C. FARMER, OF MINNEAPOLIS, MINNESOTA, ASSIGNOR TO THE PLYMOUTH MANUFACTURING COMPANY, OF SAME PLACE.

PENDULUM WEIGHING-SCALE.

SPECIFICATION forming part of Letters Patent No. 499,378, dated June 13, 1893.

Application filed July 25, 1892. Serial No. 441,114. (No model.)

*To all whom it may concern:*

Be it known that I, LUTHER C. FARMER, a citizen of the United States, residing at Minneapolis, in the county of Hennepin and State of Minnesota, have invented certain new and useful Improvements in Weight and Pressure Indicating Mechanism, of which the following is a specification.

My invention has for its object to improve weight and pressure indicating mechanism of that class in which a pointer or finger is made to move adjacent to a dial, and thereby indicate the weight or pressure exerted upon the mechanism; and the invention consists of improvements of the combinations and in the disposition of the various co-acting parts of the device, whereby accuracy of operation, simplicity, and compactness of arrangement are secured.

My invention is capable of various different embodiments without departing from its essential features; and in order the better to illustrate the invention I have shown three different forms or embodiments thereof in the drawings hereto attached.

Figure 2:
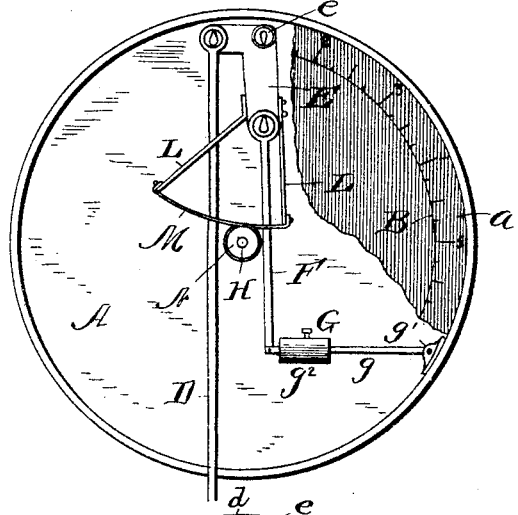
Figure 3:
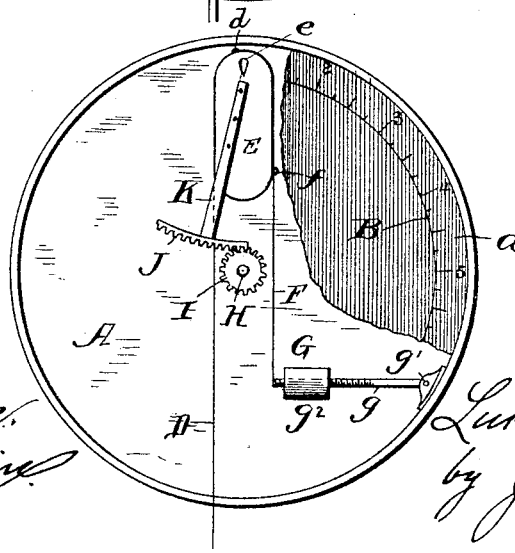

In the drawings Figures 1, 2 and 3 are respectively face views of three different forms of the invention, parts of the casing inclosing the mechanism in each instance being partly broken away.

The casing in which the apparatus is mounted is designated by A, the front face, $a$, of which is formed into or carries a dial B, over which the pointer C moves. It is desirable that the casing should be circular in outline, and that the sub-divisions of the dial should be equally distant apart, and I have therefore disposed and combined the parts of the device with special reference to arranging and combining them within the restricted confines of a casing of this general shape, and so also that the pointer shall move a like distance for each unit of weight or pressure added to the load which is to be indicated by the mechanism.

The casing A may be connected by a standard with the platform of a scale of any usual construction, or it may be suspended and have depending from it the scoop, hook or platform which receives articles to be weighed; or the mechanism within the casing may be connected with an apparatus adapted to receive pressure of steam or other fluid the pressure of which it is desired should be indicated. Throughout this specification, however, I shall employ the term "platform" to designate whatever device may be used to hold the articles to be weighed, or to receive the pressure which is to be indicated.

D represents the connection between the platform and the mechanism within the casing. It may consist of a bar, as shown in Figs. 1 and 2, or of a flexible band, as shown in Fig. 3.

The platform connection D is secured to the short arm of a lever E, fulcrumed at $e$ in the upper part of the casing, and having its long arm depending and united, by a connection F, with the counter-balancing weight G.

The weight connection F may be a flexible band, as shown in Figs. 1 and 3, or a rigid bar or link, as shown in Fig. 2. In the construction shown in Fig. 1, the band forming the weight connection F is united with the long arm of the lever E near its upper end, and as the lever is rocked, under the influence of a weight or pressure upon the platform, a cam-shaped face E' of the long lever arm engages with the said band, the result being that the point of contact of the weight connection F with the said arm is moved farther and farther to one side of the fulcrum of the lever, the farther the connection D is drawn down, thus increasing the effectiveness of the weight, as is necessary in this style of indicating devices. The cam-shape of the face E' of the long lever arm operates to give a movable place of contact of the flexible weight connection F with the lever, whereby the desired regularity of movement of the lever and pointer,—herein before referred to,—is insured. In Fig. 2 the rigid bar forming the weight connection is pivotally united with the lower end of the lever E. In this case, as in the one just described, the rocking of the lever by reason of the weight upon the platform, causes the point of attachment of the weight connection with the lever to be moved farther to one side of the fulcrum of the lever, the greater the weight upon the platform is. In Fig. 3 a single flexible band forms both the platform and the weight connections.

It is secured at $d$ to the short arm of the lever, and passes thence over the curved upper end of the same and down the side of the long arm to which it is secured near its lower end, at $f$.

The weight G consists, preferably, of a horizontally arranged lever $g$, disposed in the lower part of the casing, and pivoted to a lug $g'$ at one side of the casing. Upon this lever is mounted a movable weight $g^2$, which is provided with means for securing it to the lever after it has been adjusted thereon longitudinally, such as the screw threads shown in Figs. 1 and 3, or the set screw, indicated in Fig. 2.

The pointer C is mounted upon a shaft H which is free to turn in its supports in the casing. This shaft is connected with the lever E so that as the latter is moved, the pointer will likewise move over the face of the dial B.

The preferred means for operating the pointer are a pinion I upon the shaft H, and a rack J carried by the lever E and engaging with the pinion. The rack may be secured directly to the long arm of the lever E, as shown in Fig. 1 or it may be carried by an arm K separate therefrom but secured thereto, as shown in Fig. 3. In Fig. 2 the long arm of the lever is shown as being provided with two arms, L, L, to the ends of which is secured a cord or flexible band M which passes around the shaft H or around a drum thereon, so as to turn the shaft and its pointer when the lever is moved.

Wherever the parts are pivotally united I prefer to make use of knife-edge bearings as shown in the drawings.

It will be observed that the lever E is arranged substantially midway between the opposite sides of the casing, being fulcrumed in the upper part thereof and having its long arm projecting downward toward the center of the casing. This arrangement, especially when taken in connection with the horizontally arranged weight lever in the lower part of the casing disposes the parts in the most advantageous manner within the casing giving great compactness of arrangement and causing them to operate very effectively.

What I claim as my invention is—

1. The combination of the casing, a horizontally arranged counterbalancing weight disposed in the lower part of the casing, the lever E having a long depending arm extending downward substantially midway between the sides of the casing, the connection F between the weight lever and the said arm, the platform connection D connected with the short arm of the lever, the pointer and the connection between the pointer and the lever E, substantially as set forth.

2. The combination of the weight, the lever having the cam-face E', the flexible connection F between the weight and the lever, and arranged to engage with the said cam face when the lever is moved, the platform connection D connected with the lever, the pointer C, having a pinion upon its shaft, and the rack secured to the end of one of the arms of the lever and engaging with the said pinion, substantially as set forth.

3. The combination of the casing, circular in outline, the horizontally arranged weight lever disposed in the lower portion of the casing, the lever E fulcrumed in the upper part of the casing and having a long depending arm, the connection F uniting the said weight lever and the long arm of the lever E, the platform connection D connected with the short arm of the lever E, the pointer which moves over a dial on the face of the casing, and the connections between the pointer and the lever E, whereby the former is turned as the latter is moved, substantially as set forth.

In testimony whereof I affix my signature in presence of two witnesses.

LUTHER C. FARMER.

Witnesses:
H. M. FARNAM,
JOHN J. MARTIN.